USO09649644B2

United States Patent
Sloan

(10) Patent No.: US 9,649,644 B2
(45) Date of Patent: *May 16, 2017

(54) LOW PROFILE ATTACHMENT FOR EMITTING WATER

(71) Applicant: Euramax International, Inc., Norcross, GA (US)

(72) Inventor: W. Haynes Sloan, Gallatin, TN (US)

(73) Assignee: Euramax International, Inc., Norcross, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/978,724

(22) Filed: Dec. 22, 2015

(65) Prior Publication Data

US 2016/0107174 A1 Apr. 21, 2016

Related U.S. Application Data

(63) Continuation of application No. 14/050,857, filed on Oct. 10, 2013, now Pat. No. 9,457,360, which is a
(Continued)

(51) Int. Cl.

| | |
|---|---|
| B05B 1/04 | (2006.01) |
| B05B 1/00 | (2006.01) |
| B05B 15/06 | (2006.01) |
| E04D 13/08 | (2006.01) |
| B05B 1/02 | (2006.01) |
| B05B 1/28 | (2006.01) |
| B05B 9/01 | (2006.01) |
| F16L 9/02 | (2006.01) |
| F16L 33/30 | (2006.01) |
| F16L 47/04 | (2006.01) |

(52) U.S. Cl.
CPC ............. *B05B 1/044* (2013.01); *B05B 1/00* (2013.01); *B05B 1/02* (2013.01); *B05B 1/042* (2013.01); *B05B 1/28* (2013.01); *B05B 9/01* (2013.01); *B05B 15/065* (2013.01); *E04D 13/08* (2013.01); *F16L 9/02* (2013.01); *F16L 33/30* (2013.01); *F16L 47/04* (2013.01); *E04D 2013/0806* (2013.01)

(58) Field of Classification Search
CPC .. B05B 1/00; B05B 1/044; B05B 1/28; B05B 9/01; B05B 1/042; B05B 15/065; B05B 1/02; F16L 33/30; F16L 47/04; F16L 9/02
USPC ....... 239/499, 525, 531, 589, 592, 593, 594, 239/597, 598, 600, 601; 285/305, 328, 285/331, 397, 398, 399, 239, 256, 259; 52/16; 138/177
See application file for complete search history.

(56) References Cited

U.S. PATENT DOCUMENTS

| 749,232 | A | * | 1/1904 | Shaw ........................ B05B 1/32 |
|---|---|---|---|---|
| | | | | 239/593 |
| 1,239,373 | A | * | 9/1917 | Farmer et al. .......... B05B 1/042 |
| | | | | 239/594 |

(Continued)

*Primary Examiner* — Steven J Ganey
(74) *Attorney, Agent, or Firm* — Richard T. Matthews; Williams Mullen

(57) ABSTRACT

The present invention provides an attachment for emitting water from an elevated water source. The attachment comprises an inlet section, a transitional section connected to the inlet section an outlet section connected to the transitional section opposite from the inlet section, and a rib member attached to the outlet section to support the shape of the outlet section.

19 Claims, 4 Drawing Sheets

Related U.S. Application Data continuation of application No. 13/545,713, filed on Jul. 10, 2012, now Pat. No. 8,556,195, which is a continuation of application No. 12/620,327, filed on Nov. 17, 2009, now Pat. No. 8,251,302, which is a continuation-in-part of application No. 12/262,621, filed on Oct. 31, 2008, now Pat. No. 7,748,650, which is a continuation of application No. 11/561,313, filed on Nov. 17, 2006, now Pat. No. 7,458,532.

(56) References Cited

U.S. PATENT DOCUMENTS 4,688,720 A * 8/1987 MacDonald ............ B05B 17/08
  239/592
9,457,360 B1 * 10/2016 Sloan, Jr. .................. B05B 1/00

* cited by examiner

LOW PROFILE ATTACHMENT FOR EMITTING WATER

CROSS-REFERENCES TO RELATED APPLICATIONS

This application is a continuation application of U.S. patent application Ser. No. 14/050,857 filed Oct. 10, 2013, which is a continuation application of U.S. patent application Ser. No. 13/545,713, filed Jul. 10, 2012, now U.S. Pat. No. 8,556,195, which is a continuation application of U.S. patent application Ser. No. 12/620,327, filed Nov. 17, 2009, now U.S. Pat. No. 8,251,302, which is a continuation-in-part application of U.S. patent application Ser. No. 12/262,621, filed Oct. 31, 2008, now U.S. Pat. No. 7,748,650, which is a continuation application of U.S. patent application Ser. No. 11/561,313, filed Nov. 17, 2006, now U.S. Pat. No. 7,458,532, the disclosures of which are hereby incorporated by reference herein in their entireties.

A portion of the disclosure of this patent document contains material that is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

All patents and publications described herein are hereby incorporated by reference in their entirety.

FIELD OF THE INVENTION

The present invention relates generally to an attachment for emitting water from a water source, and more specifically, but not by way of limitation, to a drain pipe attachment that has a low profile design to emit water from a pipe or down spout.

BACKGROUND OF THE INVENTION

Numerous prior art attachment designs exist to direct water flowing from pipes and down spouts on buildings. These prior art designs have attempted to manipulate the outflow of water from the pipes and down spouts in order to increase the flow efficiency of the water or transfer the water to a different location.

However, almost all of the prior art patents fail to adequately provide an apparatus which properly disperses the water away from the down spout or pipe and maintains the water dispersing apparatus in such a manner to keep the prior art water dispersing apparatus from interfering with operations and maintenance around the water dispersing apparatus. For example, U.S. Pat. Nos. 2,814,529, 3,861,419, and 5,358,007, require manual manipulation of the water dispersing apparatus to move these prior art devices out of the way when maintenance or other operations are required around those prior art down spouts or water dispersing devices.

Other prior art devices have attempted to position the water outlet attachment in the surrounding structure or the ground. However, these prior art devices failed to adequately maintain the structural integrity of the water outlet device in order to maintain the water flow from the pipe or down spout. For example, U.S. Pat. No. 2,397,655 lacks any reinforcing feature designed to strengthen the device and requires structural support from the surrounding materials in to which it is inserted in order to maintain a proper water exit opening height for the drain pipe.

The current invention is an improvement over the old designs in several ways. For example, the current invention adds a structural support element build into the water emitting attachment in order to maintain the dimensions of the outlet end of the attachment. Also, the inlet end of the current invention facilitates engagement of the water emitting attachment to a pipe or down spout through inclusion of ribbed attachment members spaced around the inlet end of the current invention. Also, the outlet end of the current invention is an improvement over these prior art devices through the improved water emitting design that increases the fluid dynamic flow out of the outlet end of the current invention thereby reducing erosion around the outlet end of the current invention.

Thus, there is a need in the art for a low profile attachment with increased structural integrity for efficiently emitting water from a pipe or down spout.

SUMMARY OF THE INVENTION

The present invention provides an attachment for emitting water from a water source. The attachment comprises an inlet end, a transitional section connected to the inlet end, an outlet end connected to the transitional section opposite from the inlet end, and a reinforcement member attached to the transitional sectional and the outlet end to support the transitional section. The inlet end includes an external cover and an internal sleeve disposed within and spaced from the external cover.

The internal sleeve of the drain pipe attachment includes a plurality of attachment members spaced along the outer surface. The attachment members are positioned to removably secure the water source to the drain pipe attachment. The outlet end includes a dispersing opening and a support rim supporting the dispersion opening. In this embodiment the outlet height is smaller than the inlet height and the outlet width is larger than the inlet width.

The invention is designed to lower the exit height of drain pipes and down spouts. The invention provides a less obtrusive exit from the pipe or down spout. This lowered exit area facilitates maintenance around the exit area of the pipe or down spout and reduces erosion of the surrounding surface near the exit of the water source to which the invention is attached.

The invention has numerous uses in water dispersion areas. For example, the invention can be utilized in such areas as over the top of curbs, into boundary swells, from landscaping beds onto the lawn, onto the tops of sidewalks and driveways, in flat elevations, and in sloping grades.

In one embodiment, this invention is designed to have an outlet end height that is approximately 75 percent lower than the exit height of other conventional drain pipe/down spout attachments. However, the current invention still allows a smooth flow of water out of the dispersion, or exit, opening without increasing the effective erosion on the ground surrounding the exit opening.

When placed in a manner such that the outlet end of the attachment extends out into a yard or landscaped area, maintenance and lawn care around the outlet end is easily accomplished due to the fact that a mower can mow over the outlet end without damaging the mower or the invention.

Accordingly, it is an object of the present invention to provide an improved attachment for emitting water from a water source.

Another object of the present invention is to provide a water emitting attachment that has an outlet opening that is shorter in height than the height of the inlet opening.

Another object of the present invention is to provide a water emitting attachment that has an outlet opening that has a low profile exit height.

Another object of the present invention is to provide a water emitting attachment that has an outlet opening that facilitates maintenance around the exit of the attachment without the need for repositioning of the attachment.

Yet another object of the present invention is to provide a water emitting attachment adapted to direct water from a pipe or down spout.

Still yet another object of the present invention is to provide an attachment for emitting water that contains a self reinforcing section to promote the retention of the size of the outlet opening of the attachment.

Numerous other objects, features, and advantages of the present invention will be readily apparent to those skilled in the art, upon a reading of the following disclosure, when taken in conjunction with the accompanying drawings.

BRIEF DESCRIPTION OF THE DRAWINGS

FIG. 3 details the transitional section and the direction of flow of water through the current invention.

FIG. 5 details one embodiment of the inlet end of the current invention, including the external cover, internal sleeve, and plurality of attachment members.

DESCRIPTION OF THE PREFERRED EMBODIMENTS

Figure 1:
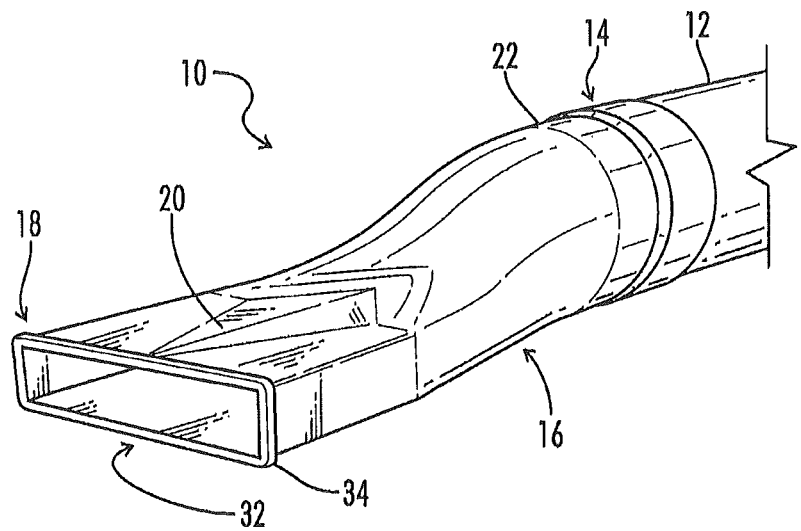
FIG. 1 is a perspective view of an embodiment of the present invention showing the outlet end.
Figure 2:
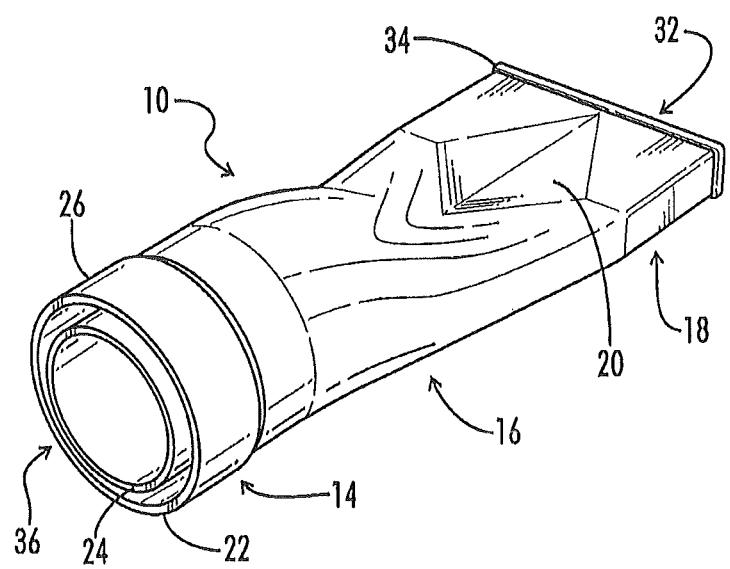
FIG. 2 is a perspective view of one embodiment of the current invention showing the inlet end.

Referring now to the drawings, and particularly to FIG. 1, an attachment for emitting water is shown and generally designated by the numeral 10. The attachment 10 can also be described as a low profile exit emitter 10, a drain pipe attachment 10, or a down spout attachment 10. The attachment 10 for emitting water (not shown) from a water source 12 comprises an inlet end 14, a transitional section 16 connected to the inlet end 14, an outlet end 18 connected to the transitional section 16 opposite from the inlet end 14 The inlet end 14, also described as a universal received 14, of the attachment 10 accepts water from the water source 12 and allows that water to pass through the transitional section 16 and to the outlet end 18 where the water exits the attachment 10.

In a preferred embodiment, the inlet end 14 includes an external cover 22 and an internal sleeve 24 disposed within and spaced from the external cover 22. The external cover 22 and internal sleeve 24 are designed to match the water source 12 in order to facilitate the movement of the water from the water source 12 to the attachment 10. The water source 12 fits between the external cover 22 and internal sleeve 24. This placement allows the free flow of water from the water source 12 through the inlet end 14 of the attachment 10.

Figure 5:
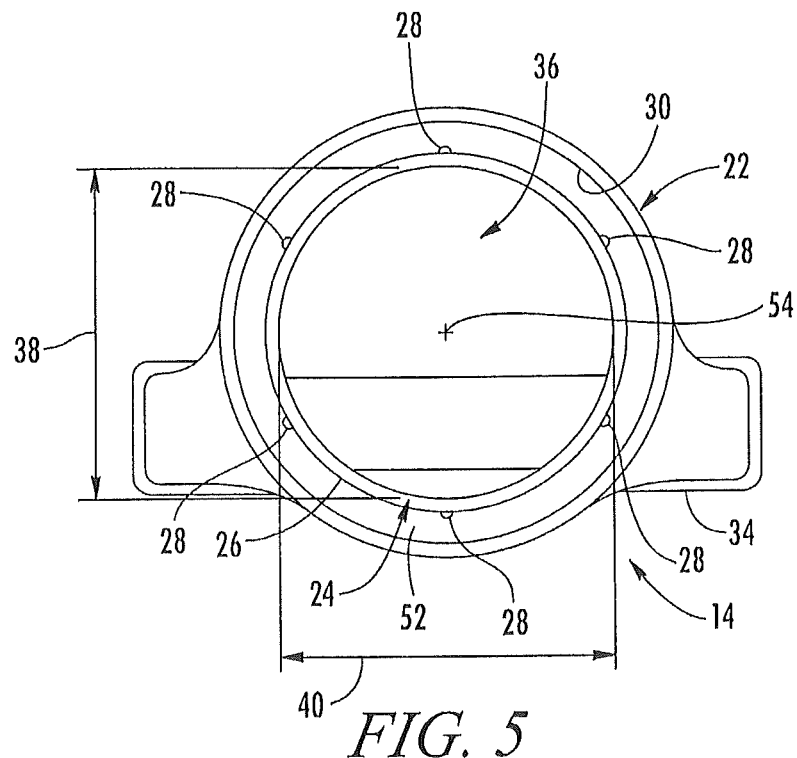
FIG. 5 shows an end view of the current invention.
Figure 6:
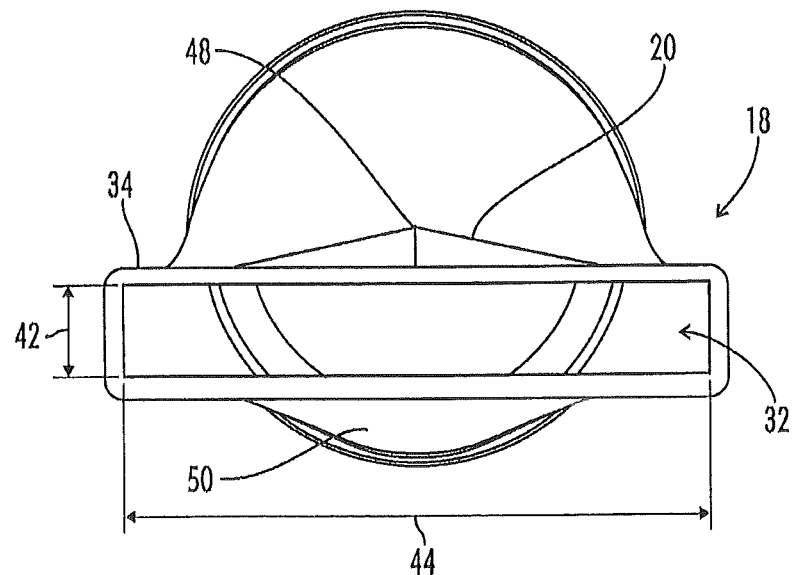
FIG. 6 shows an end view of the outlet end of the current invention.
Figure 7:
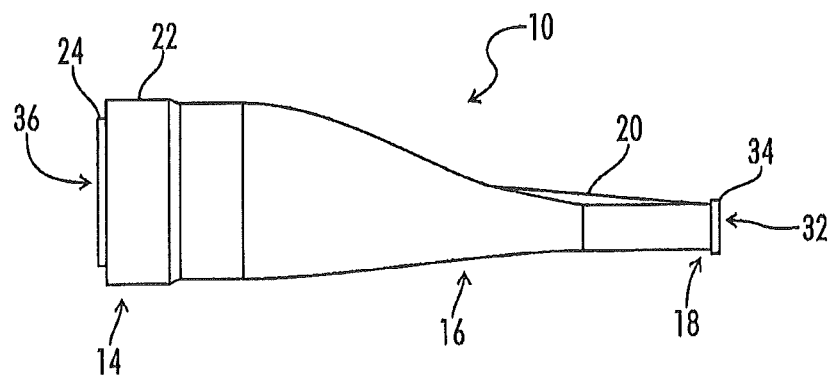
FIG. 7 is an end view of the outlet end of the embodiment of FIG. 1.

As seen in FIG. 5, the internal sleeve 24 includes an outer surface 26 and a plurality of attachment members 28 spaced along the outer surface 26 and positioned to removably secure the water source 12 to the inlet end 14 of the attachment 12. The attachment members 28 are ribbed type extensions along the outer surface 26 of the internal sleeve 24. In alternate embodiments, the attachment members 28 can include slots designed to accept the water source 12, buckles, snaps, hooks, and other fasteners known to one skilled in the art to secure two items together.

Figure 8:
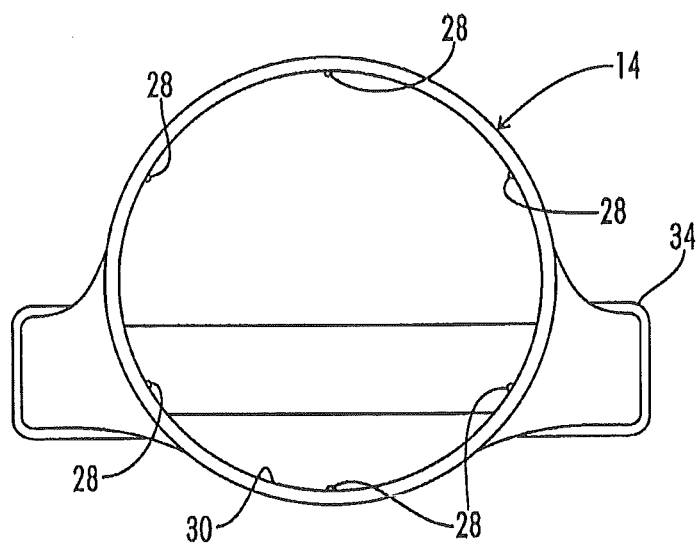
FIG. 8 shows a side view of a resilient finger and lateral projection of the embodiment of FIG. 1.

The inlet end 14 can be configured in various ways to facilitate the engagement between the attachment 10 and the water source 12. For example, the internal sleeve 24 can surround the water source 12 in order to define the engagement between the attachment 10 and the water source 12. Also, as seen in FIG. 8, the external cover 22 can contain a plurality of attachment members 28 spaced along the interior surface 30 of the external cover 22. These attachment members 28 can engage the water source 12 in order to facilitate the attachment between the water source 12 and the inlet end 14 of the attachment 10.

The shape of the inlet end 14 can vary in order to correspond with and attach to the water source 12. For example, the inlet end 14 can have a circular shape, a polygonal shape, an elliptical shape, and other shapes that correspond to the form of the water source 12.

Additionally, inlet end 14 can include a center point 54 wherein the dispersion opening 32 of the outlet end 18 is positioned below the center point 54. This facilitates the low profile design of the attachment 10.

Due to the design of the outlet end 18, the effects of erosion are reduced when the current invention is used to disperse water. This reduction occurs due to the fact that the attachment 10 disperses the fluid exiting the outlet end 10 of the attachment 18 over a wider area than the area of dispersion of most conventional devices used for water dispersion in association with a pipe or down spout. The size of the outlet width 44 of the outlet end 18 slows the speed of the water exiting the water source, thereby reducing the effects of erosion on the surrounding area.

The outlet end 18 includes a dispersion opening 32, also called an outlet opening 32, and a support rim 34 surrounding and supporting the dispersion opening 32. The support rim 34, also described as a support rib 34, enhances the durability of the outlet end 18, and especially the dispersion opening 32. The support rim 34 can vary in size depending on the external forces applied on the dispersion opening 32 in a manner as to close the dispersion opening 32. The support rim 34 helps to maintain the size of the dispersion opening 32 by providing support to the dispersion opening 32 to counteract the closing effect that external forces apply to the dispersion opening 32.

The inlet end 14 includes an intake opening 36. The intake opening 36 includes an inlet height 38, also called an inlet vertical dimension 38, and inlet width 40. The outlet end 18 includes a dispersion opening 32 having an outlet height 42, also called an outlet vertical dimension 42, and an outlet width 44. The relationship between the inlet height 38 and the outlet height 42, as well as the relationship between the inlet width 40 and the outlet width 44, can vary according to different embodiments of the current invention and still maintain the spirit of the invention.

For example, in one of the embodiments the outlet width 44 is at least 1.5 times larger than the inlet width 40. In another embodiment, the inlet height 38 is at least twice as large as the outlet height 42. In another embodiment, the inlet height 38 is designed to accept 3 inch or 4 inch diameter piping from a water source 12. The attachment 10 then transitions to an outlet height 42 of 1.5 inches tall and outlet width 44 of 6 inches long. Preferably, the outlet vertical dimension 42 is substantially less than the inlet vertical dimension 38.

The reinforcement member 20 is designed to support the transitional section 16 and potentially the outlet end 18 without necessarily engaging the outlet end 18. The reinforcement 20 can be attached to the transitional section 16 and the outlet end 18 and can span the connection between the transitional section 16 and the outlet end 18.

The reinforcement member 20 has a diamond, or pyramid, shaped appearance that increases in mass from the edges 46 of the reinforcement member 20 to a peak point 48. The design of the reinforcement member 20 strengthens the intermediate area between the outlet end 18 and the transitional section 16. This allows the apparatus 10 to be placed in the ground or under other objects that apply pressure and/or weight onto the attachment 10. The reinforcement member 20 helps to maintain the cross-sectional area of the outlet end 18. This facilitates a smooth flow of the water out the outlet end 18. The shape and the location of the reinforcement member 20 can vary from different embodiments of the current invention. The reinforcement member 20 however, needs to maintain a location such that it can support the transitional section 16 and the outlet end 18 to maintain proper spacing of the outlet end of the dispersing opening 32 of the outlet end 18.

Figure 3:
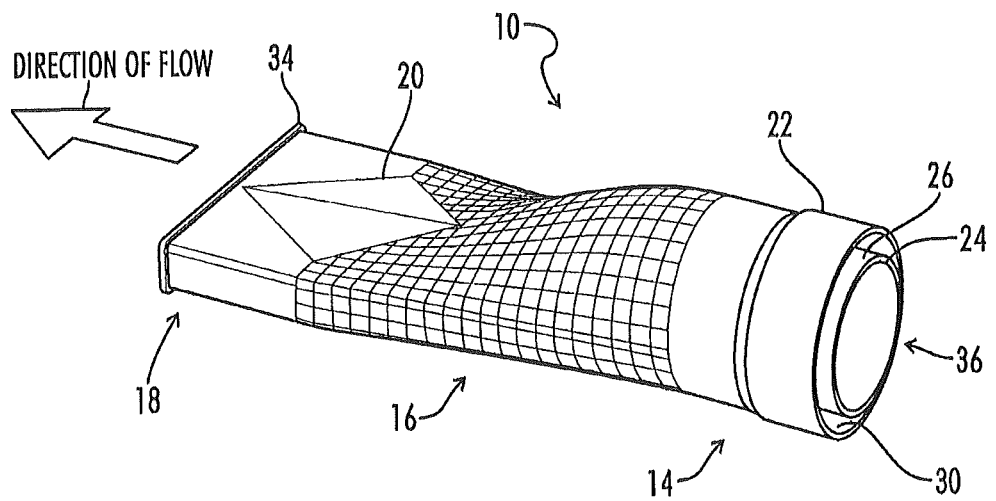
FIG. 3 is a perspective view of the current invention.
Figure 4:
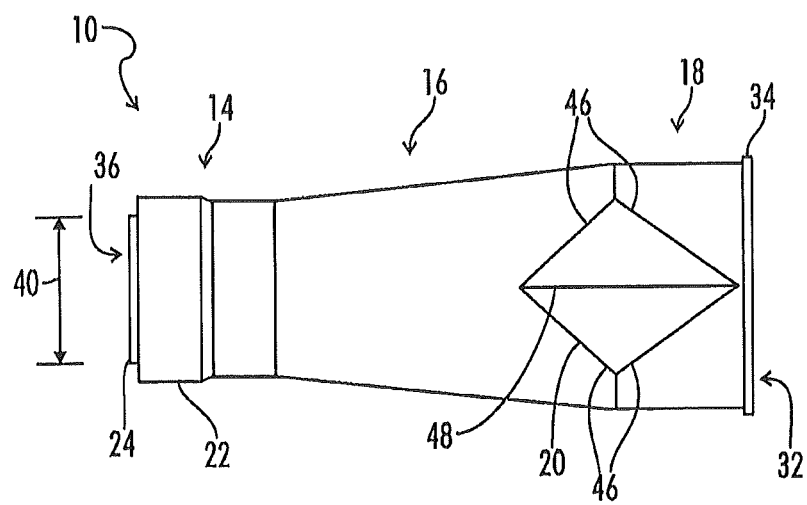
FIG. 4 shows a top view of the current invention.

FIG. 3 details the transition from the inlet end 14 to the outlet end 18 through the transitional section 16. The transitional section 16 provides a geometric transition from a circular inlet end 14 to a rectangular outlet end 18. This figure also shows the preferred direction of flow of the water passing through the attachment 10.

The attachment 10 includes a collection area 50 designed to collect a small amount of water as it passes through the attachment 10. This collection area 50 effectively widens the stream of water as the water passes through the attachment 10 and decreases erosion of the area near the outlet end 18. Also, the attachment 10 includes a base 52 designed to engage the water source 12 as the water source 12 fully engages the inlet end 14. This base 52 gives the user of the attachment 10 a reference point in which to connect the water source 12 with the attachment 10.

The attachment 10 is used in a gravity flow, surface drainage system and is designed to attach to a water source 12 that comprises a 3 inch diameter pipe, a 4 inch diameter pipe, or a 4 inch diameter corrugated pipe. The attachment 10 is also designed to attach to a down spout that directs water from a building. The attachment 10 can be designed to attach to any shaped down spout known by one skilled in the art to direct water away from a building and still maintain its inventive spirit.

The attachment 10 is composed of polymers, but can be composed of metal, ceramic, polyvinyl chloride or other comparable materials.

In a preferred embodiment, the overall length of the apparatus 10 is 18.25 inches long. The outlet end 18 is rectangular in shape and measures 1.5 inches tall by 6.6 inches wide. The internal sleeve 24 has an internal diameter of 3.63 inches and the outer surface 26 has an exterior diameter of 5.0 inches. The reinforcement member 20 extends back 6.5 inches towards the transitional section 16 and increase in height from the outlet width 44 to the peak pint 48 in a 12 degree measurement. The support rim 34 extends 0.25 inches from the dispersing opening 32 and extends backwards 0.25 inches from the dispersing opening 32.

Thus, it is seen that the apparatus of the present invention readily achieves the ends and advantages mentioned as well as those inherent therein. While certain preferred embodiments of the invention have been illustrated and described for purposes of the present disclosure, numerous changes in the arrangement and construction of parts may be made by those skilled in the art, which changes are encompassed within the scope and spirit of the present invention as defined by the appended claims.

That which is claimed is:

1. A drainage attachment for directing water from an elevated water source, the attachment comprising:
    an inlet section comprising an inlet section length and an inlet opening, the inlet opening comprising an inlet opening width, an inlet opening height, and a center point defining a longitudinal axis;
    an outlet section comprising an outlet opening, the outlet opening comprising an outlet opening width and an outlet opening height, the outlet section further comprising an uppermost structure extending between first and second relatively lateral structures, and a lowermost structure extending between the first and second relatively lateral structures;
    a transitional section between the inlet section and the outlet section, wherein the transitional section increases in width and decreases in height towards the outlet section;
    wherein the longitudinal axis extends in a first plane that is parallel to a second plane that divides a top portion and a bottom portion of the outlet section and bisects the first and second relatively lateral structures;
    wherein at least a fraction of the top portion of the outlet section is positioned below the first plane and the lowermost structure defines a third plane lying below an interior bottom of the inlet section, thereby aiding in gravitational passing of water;
    wherein the outlet opening width is greater than each of the inlet opening width and the outlet opening height, and shaped to reduce erosion from any water flow adjacent the outlet opening; and
    wherein the combined lengths along the longitudinal axis of the transitional section and the outlet section are longer than the inlet section length along the longitudinal axis.

2. The attachment of claim 1, wherein the attachment is any one of polymeric or polyvinyl chloride.

3. The attachment of claim 1, wherein a majority of the outlet opening is positioned below the longitudinal axis, thereby aiding gravitational passing of water.

4. The attachment of claim 1, wherein the at least fraction of the top portion of the outlet section that is positioned below the first plane comprises at least half.

5. The attachment of claim 1, further comprising an elongated outlet section.

6. The attachment of claim 1, further comprising a support rib to strengthen the attachment.

7. The attachment of claim 1, wherein the inlet opening is adapted to fit the elevated water source.

8. The attachment of claim 1, wherein the elevated water source comprises any one of a pipe and a down spout.

9. The attachment of claim 1, wherein the inlet section is circular and adapted to engage a 4 inch diameter piping from the elevated water source.

10. The attachment of claim 1, wherein the outlet section is substantially rectangular.

11. The attachment of claim 1, wherein the outlet opening width is substantially greater than the inlet width.

12. The attachment of claim 1, wherein the inlet height is at least twice as large as the outlet opening height.

13. The attachment of claim 1, wherein the outlet opening height and the outlet opening width are sized to reduce water velocity at the outlet and thereby reduce erosion.

14. The attachment of claim 1, wherein the inlet section includes an attachment member to removably secure the elevated water source to the inlet section.

15. The attachment of claim 14, wherein the attachment member comprises a slot configured to engage the elevated water source.

16. A gravity flow drainage attachment for directing water from an elevated water source, the attachment comprising:
   a substantially circular inlet section comprising an inlet opening, the inlet opening further comprising an inlet width, an inlet height, and a center point;
   a substantially rectangular outlet section, the outlet section comprising an outlet opening that includes an outlet opening width and an outlet opening height, wherein the outlet opening width is greater than the outlet opening height, the outlet section further comprising an uppermost structure extending between first and second relatively lateral structures, and a lowermost structure extending between the first and second relatively lateral structures; and
   a transitional section between the inlet section and the outlet section comprising a first end adjacent the inlet section having a height and a width, and a second end adjacent the outlet section having a height and a width, wherein the width of the first end is less than the width of the second end, and the height of the first end is greater than the height of the second end, and further wherein the first end is substantially circular and the second end is substantially rectangular;
   wherein at least a portion of the outlet opening is positioned below the inlet section center point, and the lowermost structure defines a plane lying below an interior bottom of the inlet section;
   wherein the outlet width is greater than the inlet width to disperse water flowing through the attachment and out of the outlet opening, thereby reducing the effects of erosion at the drainage location adjacent the outlet opening.

17. The attachment of claim 16, wherein the attachment is any one of polymeric or polyvinyl chloride.

18. A gravity flow drainage attachment for directing water from an elevated water source, the attachment comprising:
   an inlet section comprising an inlet opening, the inlet opening further comprising an inlet width, an inlet height, and a center point;
   a substantially rectangular outlet section, the outlet section comprising an outlet opening that includes an outlet opening width and an outlet opening height, wherein the outlet opening width is greater than the outlet opening height, the outlet section further comprising an uppermost structure extending between first and second relatively lateral structures, and a lowermost structure extending between the first and second relatively lateral structures; and
   a transitional section between the inlet section and the outlet section comprising a first end adjacent the inlet section having a height and a width, and a second end adjacent the outlet section having a height and a width, wherein the width of the first end is less than the width of the second end, and the height of the first end is greater than the height of the second end;
   wherein at least a portion of the outlet opening is positioned below the inlet section center point, and the lowermost structure defines a plane lying below an interior bottom of the inlet section; and
   wherein the outlet width is greater than the inlet width to disperse water flowing through the attachment and out of the outlet opening, thereby reducing the effects of erosion at the drainage location adjacent the outlet opening.

19. The attachment of claim 18, wherein the attachment is any one of polymeric or polyvinyl chloride.

* * * * *